United States Patent
Sugimoto et al.

(10) Patent No.: US 7,104,664 B2
(45) Date of Patent: Sep. 12, 2006

(54) APPARATUS FOR AUTOMATICALLY ADJUSTING DIRECTION OF LIGHT AXIS OF VEHICLE HEADLIGHT

(75) Inventors: Toshio Sugimoto, Okazaki (JP); Yoshitaka Sato, Toyohashi (JP); Koji Ishiguro, Toyoake (JP)

(73) Assignee: Denso Corporation, Kariya (JP)

( * ) Notice: Subject to any disclaimer, the term of this patent is extended or adjusted under 35 U.S.C. 154(b) by 27 days.

(21) Appl. No.: 10/948,168

(22) Filed: Sep. 24, 2004

(65) Prior Publication Data

US 2005/0068782 A1 Mar. 31, 2005

(30) Foreign Application Priority Data

Sep. 26, 2003 (JP) ............................. 2003-335520
Jul. 14, 2004 (JP) ............................. 2004-206851

(51) Int. Cl.
   *B60Q 1/06* (2006.01)
   *B60Q 1/08* (2006.01)
(52) U.S. Cl. .......................... 362/37; 362/36; 362/40; 362/464; 362/465; 362/466
(58) Field of Classification Search ................. 362/36, 362/37, 39, 40, 46, 53, 282, 284, 276, 322, 362/324, 465, 464, 466, 802; 180/168
   See application file for complete search history.

(56) References Cited

U.S. PATENT DOCUMENTS 5,562,336 A * 10/1996 Gotou ........................ 362/466
5,660,454 A * 8/1997 Mori et al. .................. 362/466
5,711,590 A * 1/1998 Gotoh et al. .................. 362/43
5,781,105 A * 7/1998 Bitar et al. .................. 340/468
6,752,508 B1 * 6/2004 Kobayashi .................... 362/37
2004/0114379 A1 * 6/2004 Miller et al. ................. 362/464
2004/0114381 A1 * 6/2004 Salmeen et al. ............. 362/465

FOREIGN PATENT DOCUMENTS

JP         8-132955         5/1996

* cited by examiner

*Primary Examiner*—Sandra O'Shea
*Assistant Examiner*—Jacob Y. Choi
(74) *Attorney, Agent, or Firm*—Posz Law Group, PLC

(57) ABSTRACT

The apparatus for automatically adjusting a direction of a light axis of a vehicle headlight of the invention has a configuration in which the swivel control unit determines that the vehicle is making a left or right turn and halts the swivel control on the light axis of a vehicle headlight, if the vehicle speed detected by the vehicle speed sensor is equal to or lower than a predetermined threshold speed and at least one of the conditions that the turn indication signal is in the on state, and that the steering angle is outside a predetermined angular range is satisfied. The swivel control unit resumes the swivel control when the turn indication signal is changed into the off state.

8 Claims, 10 Drawing Sheets

APPARATUS FOR AUTOMATICALLY ADJUSTING DIRECTION OF LIGHT AXIS OF VEHICLE HEADLIGHT

CROSS-REFERENCE TO RELATED APPLICATION

This application is related to Japanese Patent Applications No. 2003-335520 filed on Sep. 26, 2003, and No. 2004-206851 filed on Jul. 14, 2004, the contents of which are hereby incorporated by reference.

BACKGROUND OF THE INVENTION

1. Field of the Invention

The present invention relates to an apparatus for automatically adjusting a light axis or a lighting area of a light beam emitted from a vehicle headlight in the horizontal direction on the basis of a steering angle.

2. Description of Related Art

It is known to perform a swivel control on a vehicle headlight for adjusting horizontally the light beam emitted from the vehicle headlight in accordance with the steering angle of the steering wheel of the vehicle.

Generally, such a swivel control is enabled while the vehicle is traveling at a speed higher than a predetermined threshold speed. Accordingly, when the vehicle is stopped or the vehicle's speed falls below the threshold speed, the swivel control is disabled, so that the vehicle headlight is returned, irrespective of the steering angle at that time, to its initial angular position where the light axis of the vehicle headlight projects in the straight forward direction or initial direction. Such a case occurs when the vehicle is making a left or right turn at an intersection, for example. When the vehicle starts moving after it has stopped to make a left or right turn, and the vehicle speed exceeds the predetermined threshold speed, the swivel control is resumed. So, the light axis of the vehicle headlight may change abruptly from the initial direction to a swivel-controlled direction depending on the steering angle at that time. Such an abrupt change in the direction of the light axis of the vehicle headlight often causes the driver to feel awkwardness in the control of beam patterns.

It is also known to disable or halt the swivel control upon the satisfaction of the conditions that the steering angle is larger than a predetermined angle, that the vehicle speed is equal to or lower than a predetermined threshold speed, and that a turn indication signal indicative of a status (on or off) of a turn indicator of the vehicle is in the on state, and to enable or resume the swivel control upon the satisfaction of the conditions that the vehicle speed is higher than the predetermined threshold speed, and that the turn indication signal is in the off state. However, in such a prior art swivel control system, there is a problem in that the driver sometimes cannot benefit the effects of the swivel control for a relatively long period of time. One example is that the vehicle travels at a low speed along a road running alongside a railroad, makes a right turn to cross a railroad crossing keeping the low speed, and makes a second right turn to go into another road running alongside the same railroad. In this example, the swivel control is disabled until the vehicle finishes the second right turn.

SUMMARY OF THE INVENTION

In one aspect of the invention, the apparatus for automatically adjusting a direction of a light axis of a vehicle headlight has a configuration in which the swivel control unit determines that the vehicle is making a left or right turn and halts the swivel control, if the vehicle speed detected by the vehicle speed sensor is equal to or lower than a predetermined threshold speed and at least one of the conditions that the turn indication signal is in the on state, and that the steering angle is outside a predetermined angular range is satisfied, the swivel control unit resuming the swivel control when the turn indication signal is changed into the off state.

In this configuration, the swivel control restarts as soon as the status of the turn indication signal is changed into the off state irrespective of the vehicle speed at that moment in order to control the direction of the light axis of the headlight responding to the steering angle. This quick resumption of the swivel control is of great help to the vehicle's driver when making a left or right turn after making a stop at an intersection, for example.

In another aspect of the invention, the apparatus for automatically adjusting a direction of a light axis of a vehicle headlight has a configuration in which the swivel control unit determines that the vehicle is making a left or right turn and halts the swivel control, if the vehicle speed detected by the vehicle speed sensor is equal to or lower than a predetermined threshold speed and a condition that the turn indication signal is in the on state is satisfied, the swivel control unit resuming the swivel control when the turn indication signal is changed into the off state.

In this configuration, the swivel control restarts as soon as the status of the turn indication signal is changed into the off state irrespective of the vehicle speed at that moment in order to control the direction of the light axis of the headlight responding to the steering angle. This quick resumption of the swivel control is of great help to the vehicle's driver when making a left or right turn after making a stop at an intersection, for example.

In another aspect of the invention, the apparatus for automatically adjusting a direction of a light axis of a vehicle headlight has a configuration in which the swivel control unit determines that the vehicle is making a left or right turn and halts the swivel control, if the vehicle speed detected by the vehicle speed sensor is equal to or lower than a predetermined threshold speed and at least one of the conditions that the turn indication signal is in the on state, and that the steering angle is outside a predetermined angular range is satisfied, the swivel control unit resuming the swivel control when the vehicle speed exceeds the predetermined threshold speed, the swivel control unit subjecting a calculated swiveling angle to a strong filtering for a predetermined time period when the swivel control is resumed, and subsequently to a weak filtering in order to avoid abrupt change in the direction of the light axis during the predetermined time period.

In this configuration, as soon as the vehicle speed exceeds the predetermined threshold speed after the swivel control is halted or disabled, the swivel control is resumed in order to adjust the direction of the light axis of the headlight responding to the steering angle. Furthermore, since the calculated swiveling angle is subjected to the strong filtering for a predetermined time period when resuming the swiveling control, the direction of the light axis of the headlight swivels only gradually during this time period. Accordingly, even when the condition for resuming the swivel control after it is disabled is only the vehicle speed, the movement of the headlight at the time of resuming the swivel control can be made gentle, and so the driver can receive the full benefit of the swivel control without feeling awkwardness in the control of the beam patterns.

In still another aspect of the invention, the apparatus for automatically adjusting a direction of a light axis of a vehicle headlight has a configuration in which the swivel control unit determines that the vehicle is making a left or right turn and halts the swivel control, if the vehicle speed detected by the vehicle speed sensor is equal to or lower than a predetermined threshold speed and the condition that the turn indication signal is in the on state is satisfied, the swivel control unit resuming the swivel control when the vehicle speed exceeds the predetermined threshold speed, the swivel control unit subjecting a calculated swiveling angle to a filtering for a predetermined time period when the swivel control is resumed in order to avoid abrupt change in the direction of the light axis during the predetermined time period.

In this configuration, as soon as the vehicle speed exceeds the predetermined threshold speed after the swivel control is halted or disabled, the swivel control is resumed in order to adjust the direction of the light axis of the headlight responding to the steering angle. Furthermore, since the calculated swiveling angle is subjected to the filtering for a predetermined time period when resuming the swiveling control, the direction of the light axis of the headlight swivels only gradually during this time period. Accordingly, even when the condition for resuming the swivel control after it is disabled is only the vehicle speed, the movement of the headlight at the time of resuming the swivel control is resumed can be made gentle, and so the driver can receive the full benefit of the swivel control without feeling awkwardness in the control of the beam patterns.

In still another aspect of the invention, the apparatus for automatically adjusting a direction of a light axis of a vehicle headlight has a configuration in which the swivel control unit determines that the vehicle is making a left or right turn and halts the swivel control, if the vehicle speed detected by the vehicle speed sensor is equal to or lower than a predetermined threshold speed and at least one of the conditions that the turn indication signal is in the on state, and that the steering angle is outside a predetermined angular range is satisfied, the swivel control unit resuming the swivel control upon detecting a change larger than a predetermined value in at least one of signals outputted from the sensors mounted on the vehicle to detect the attitude of the vehicle.

By detecting a minute change in at least one of the sensor signals outputted from the sensors mounted on the vehicle for sensing the vehicle attitude and using it as a signal for resuming the swivel control, it becomes possible for the driver to receive the benefit of the swivel control in more exact timing.

In still another aspect of the invention, the apparatus for automatically adjusting a direction of a light axis of a vehicle headlight has a configuration in which the swivel control unit determines that the vehicle is making a left or right turn and halts the swivel control, if the vehicle speed detected by the vehicle speed sensor is equal to or lower than a predetermined threshold speed, and the condition that the turn indication signal is in the on state is satisfied, the swivel control unit resuming the swivel control upon detecting a change larger than a predetermined value in at least one of the signals outputted from the sensors mounted on the vehicle to detect the attitude of the vehicle.

By detecting a minute change in at least one of the sensor signals outputted from the sensors mounted on a vehicle for sensing the vehicle attitude and using it as a signal for resuming the swivel control, it becomes possible for the driver to receive the benefit of the swivel control in more exact timing.

The swivel control unit may resume the swivel control upon detecting a lowering to within a predetermined threshold in at least one of a yaw rate signal outputted from a yaw rate sensor, a lateral acceleration signal outputted from a lateral acceleration sensor, a pitch angle signal outputted from a pitch angle sensor, a rolling angle signal outputted from a rolling angle sensor, and a vehicle swivel speed signal outputted from a vehicle swivel speed sensor, or upon detecting a lowering to within a threshold in at least one of a difference between air pressure signals indicative of air pressures of the left and right tires of the vehicle outputted from left and right air pressure sensors, a difference between left and right wheel speed signals outputted from left and right wheel speed sensors, a difference between left and right vehicle height signals outputted from left and right vehicle height sensors, and a difference between front and rear vehicle height signals outputted from front and rear vehicle height sensors.

PREFERRED EMBODIMENTS OF THE INVENTION

First Embodiment

Figure 1:
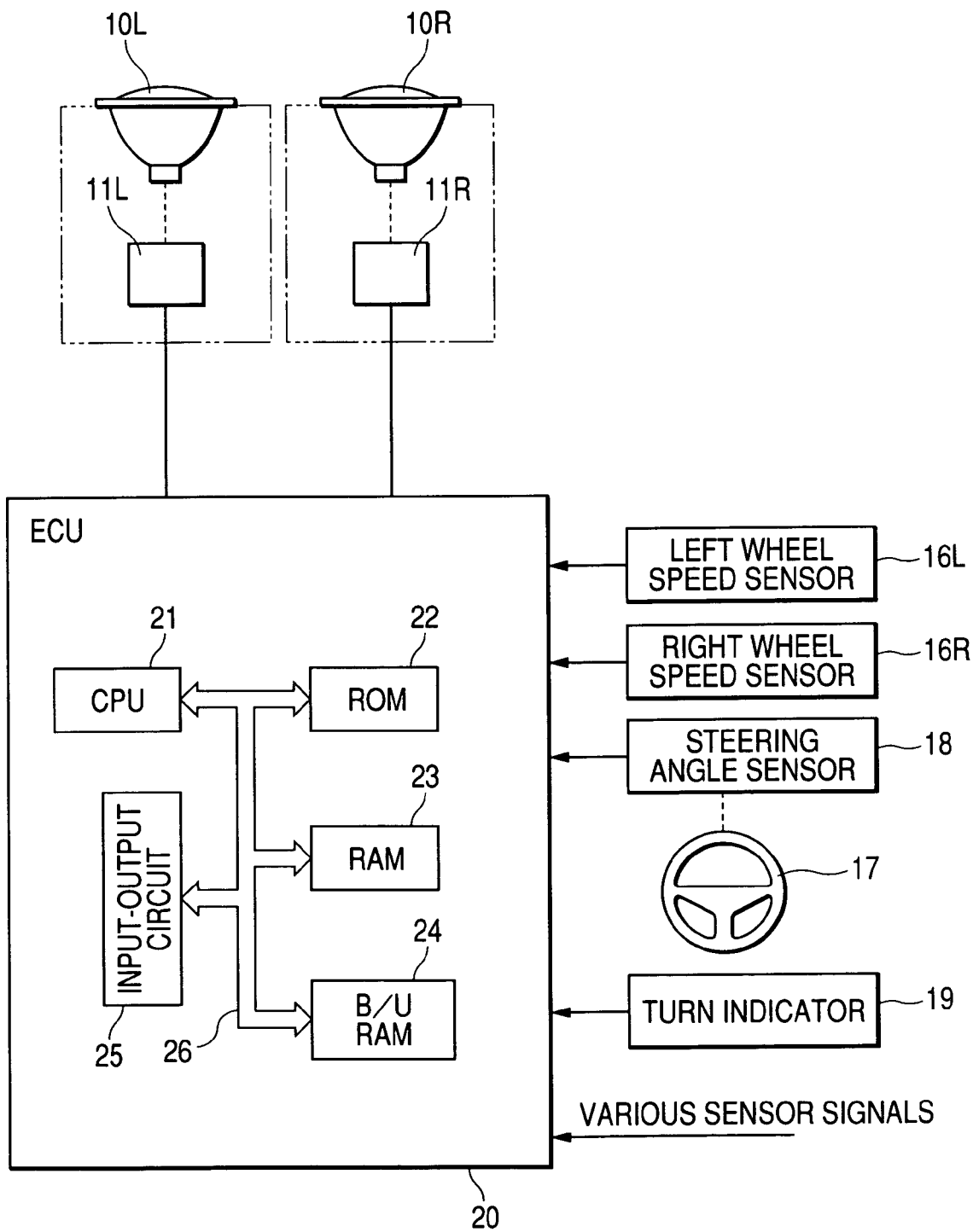
FIG. 1 is a schematic view showing an overall structure of an apparatus for automatically adjusting a direction of a light axis of a vehicle headlight according to first, second and third embodiments of the invention.

FIG. 1 shows an overall structure of an apparatus for automatically adjusting a direction of a light axis of a vehicle headlight according to a first embodiment of the invention.

In this drawing, 10L and 10R denote left and right vehicle headlights, respectively. The headlights 10L and 10R are linked to actuators 11L and 11R for adjusting the light axes of the headlights 10L and 10R in the horizontal direction. An ECU (Electronic Control Unit) includes a CPU 21 for executing various processings, a ROM 22 for storing control programs, control maps, etc., a RAM 23 for temporarily storing various data, a B/U (Back Up) RAM 24, an input-output circuit 25, and a bus line 26 for connecting these elements.

The ECU 20 receives an output signal from a left wheel speed sensor 16L detecting a left wheel speed VL, an output signal from a right wheel speed sensor 16R detecting a right wheel speed VR, an output signal from a steering angle sensor 18 detecting a steering angle STA of a steering wheel 17, a turn indication signal produced by a turn indicator 19 to indicate a status (on or off) of the turn indicator 19 which is set or reset by the driver at the time of making a left or right turn. The ECU 20 further receives other sensor signals outputted from various sensors mounted on the vehicle for sensing the behavior of the vehicle, such as a yaw rate sensor outputting a yaw rate signal, a lateral acceleration sensor outputting a lateral acceleration signal, a pitch angle sensor outputting a pitch angle signal, a rolling angle sensor outputting a rolling angle signal, a laser sensor, a radar sensor, an ultrasonic sensor outputting a swivel speed signal, left and right air pressure sensors outputting air pressure signals indicative of the pressures of the left and right tires, left and right vehicle height sensors outputting left and right vehicle height signals and front and rear vehicle height sensors outputting front and rear vehicle height signals. The actuators 11L and 11R ac to adjust horizontally the directions of the light axes of the headlights 10L and 10R in accordance with signals outputted from the ECU 20.

Figure 2:
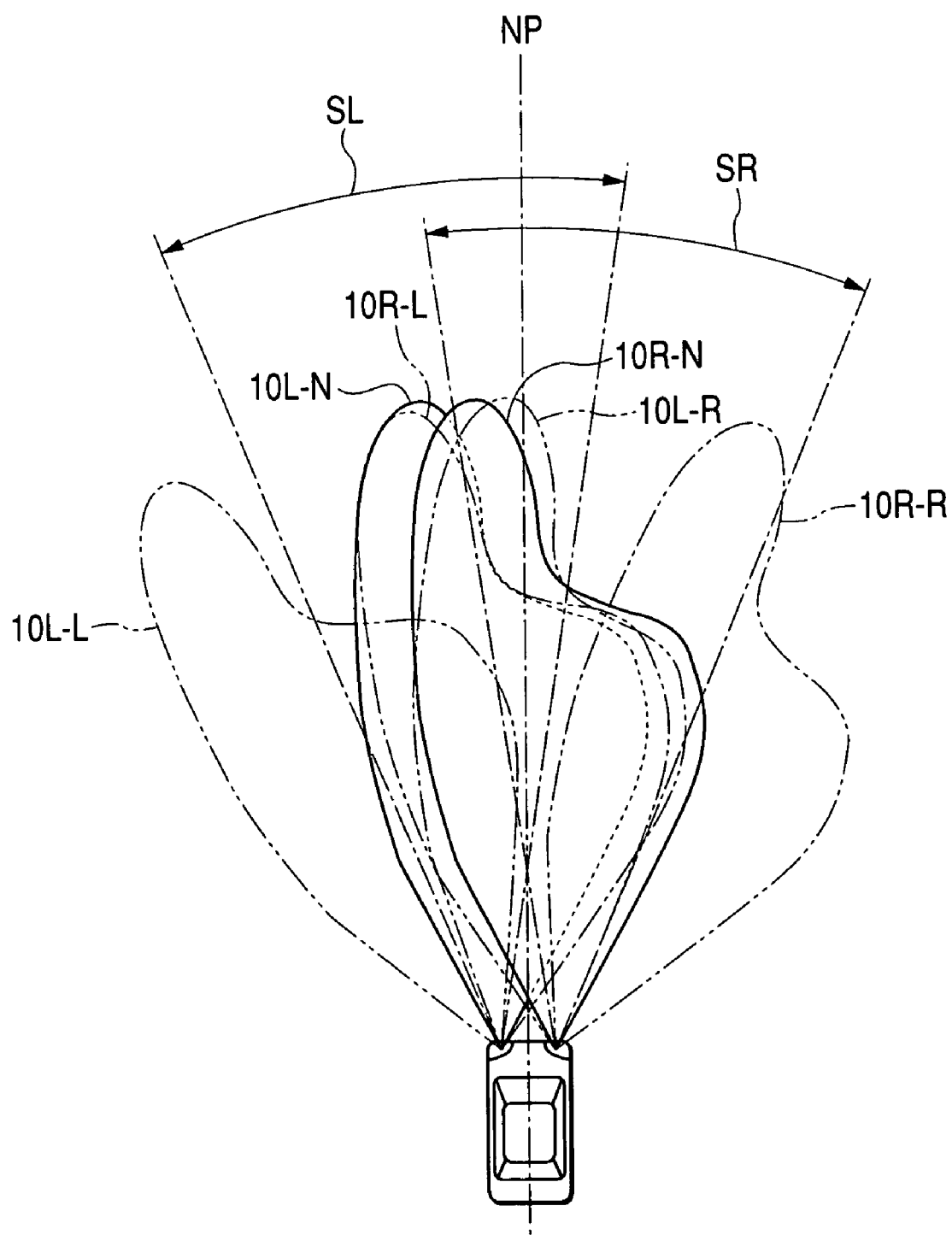
FIG. 2 is an explanatory view for explaining beam patterns of the headlights controlled by the apparatus according to the first to third embodiments.

FIG. 2 shows beam patterns of the headlight 10R and 10L (low beam). In this figure, the heavy solid line 10L-N represents a beam pattern of the headlight 10L when the steering wheel is in its neutral angular position. The arched arrow SL represents a swivel range within which the light axis of the headlight 10L can be swiveled in accordance with the steering angle of the steering wheel. The chain double-dashed lines 10L-R and 10L-L represent beam patterns of the headlight 10L when the light axis of the headlight 10L is in the rightmost position and the leftmost position within the swivel range, respectively. The heavy solid line 10R-N represents a beam pattern of the headlight 10R when the steeringwheel is in the neutral angular position. The arched arrow SR represents a swivel range within which the light axis of the headlight 10R can be swiveled in accordance with the steering angle of the steering wheel. The chain double-dashed lines 10R-R and 10R-L represent beam patterns of the headlight 10R when the light axis of the headlight 10R is in the rightmost position and the leftmost position within the swivel range, respectively.

The swivel ranges SL and SR should provide the driver with a good visibility in the leftward or rightward direction when the driver turns the steering wheel to the left or right without a sacrifice of visibility in the forward direction. Accordingly, as shown in FIG. 2, a portion of the swivel range SR at the right of the initial angular position is wider than that of the swivel range SL so that the variation of the light axis of the headlight 10R is larger than that of the headlight 10L when the driver turns the steering wheel to the right. On the other hand, a portion of the swivel range SL at the left of the initial angular position is wider than that of the swivel range SR so that the variation of the light axis of the headlight 10L is larger than that of the headlight 10R when the driver turns the steering wheel to the left.

Next, the swivel control routine which the CPU 21 of the ECU 20 performs is explained below with reference to the flowchart shown in FIG. 3, and the time chart shown in FIG. 5. In the time chart of FIG. 5, the vehicle speed SPD (km/h) is shown by the thin solid line, the steering angle STA (degree) is shown by the heavy solid line, and the swiveling angle of the light axis of the headlight 10L or 10R, which is determined to follow the steering angle through the swivel control, is shown by the heavy broken line. The CPU 21 performs this swivel control routine at regular intervals.

Figure 3:
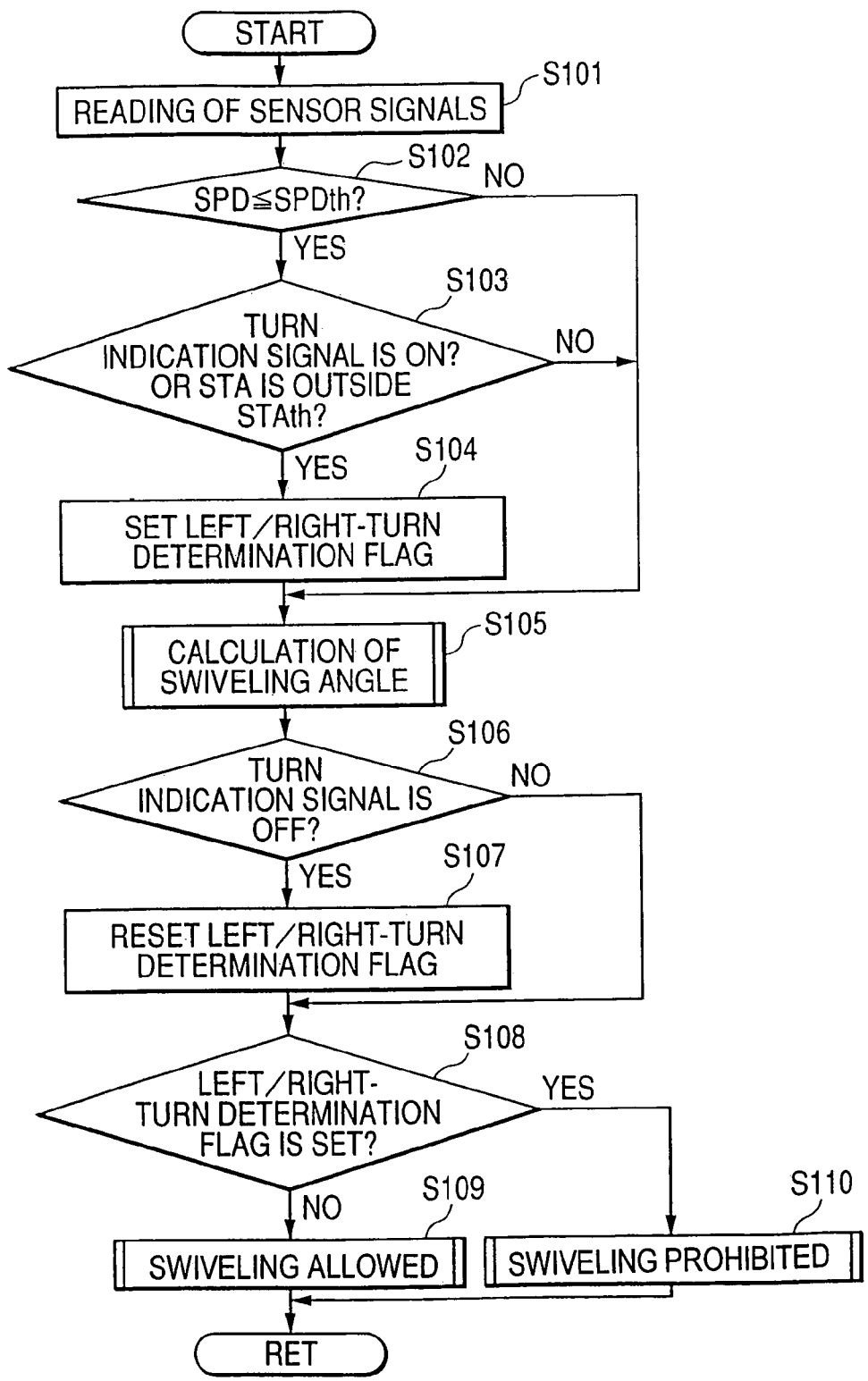
FIG. 3 is a flowchart for explaining the swivel control routine performed by a CPU within an ECU included in the apparatus according to the first embodiment.

As shown in FIG. 3, at step S101, various sensor signals are read. They include the vehicle speed SPD calculated from the left and right wheel speeds VL, VR outputted from the left and right wheel speed sensors 16L, 16R, the steering angle STA outputted from the steering angle sensor 18, and the turn indication signal (on or off) indicative of the status of the turn indicator 19. The steering angle STA is an angle by which the steering wheel 17 is turned from its neutral angular position or straight-ahead position. When the steering angle STA is within a predetermined angular range around the neutral angular position, it is determined that the vehicle is in a straight-running state.

Next, it is determined at step S102 whether or not the vehicle speed SPD is equal to or lower than a predetermined threshold speed SPDth. If it is determined at step S102 that the vehicle speed SPD is equal to or lower than the threshold speed SPDth (during the periods before the time t02, between the time 05 and the time t08, and after the time t13 in FIG. 5), then the process goes to step S103 where it is determined whether or not at least one of the conditions that the turn indication signal indicative of the status of the turn indicator 19 is in the on state, and that the steering angle STA is beyond the predetermined angular range STAth around the neutral angular position of the steering wheel 17 is satisfied.

The predetermined angular range STAth is for determining whether or not the steering wheel 17 is turned to the left or right without influence of the play of the steering wheel 17. If it is determined that at least one of the conditions that the turn indication signal is in the on state, and that the steering angle STA is beyond the predetermined angular range STAth is satisfied, then the process goes to step S104 where a left/right turn determination flag is set (during the period between the time t05 and the time t10 in FIG. 5). The time t09 at which the turn indication signal changes from the on state to the off state tends to vary. However, since the time 09 roughly coincides with the time t10 at which the steering angle STA is reduced to within the angular range STAth and accordingly a steering angle flag is reset, the time at which the left/right turn determination flag is reset may be regarded as the time t10.

Figure 5:
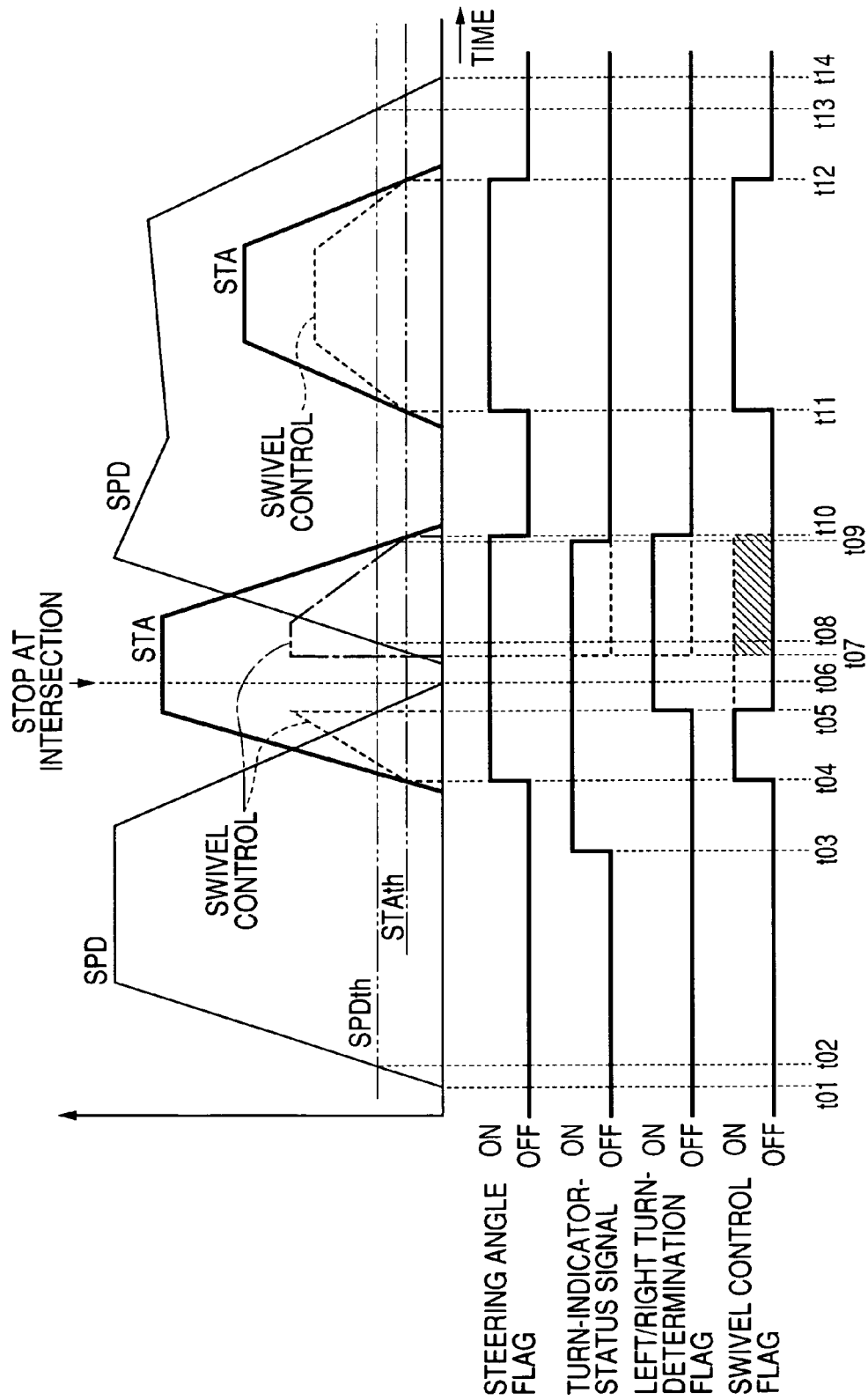
FIG. 5 is a time chart showing statuses and values of various sensor signals and controlled variables used in the swivel control routines shown in FIG. 3 and FIG. 4.

If it is determined at step S102 that the vehicle speed SPD is higher than the threshold speed SPDth (during the periods between the time t0 and the time 05, and between the time 08 and the time t13 in FIG. 5), or it is determined at step S103 that turn indication signal is in the off state (during the periods before the time t3, and after the time 09 in FIG. 5) and the steering angle STA is within the predetermined angular range STAth (during the periods before the time t04, between the time t10 and the time t11, and after the time t12 in FIG. 5), then the step S104 is skipped to preserve the current status of the left/right turn determination flag.

Next, the process goes to step S105 where the swiveling angle calculation process is executed for calculating the swiveling angles of the headlights 10L and 10R. Subsequently, it is determined at step S106 whether or not the turn indication signal is in the off state. If it is determined at step S106 that the turn indication signal is in the off state, then the process goes to step S107 where the left/right turn determination flag is reset. Otherwise the step S107 is skipped to preserve the current status of the left/right turn determination flag.

Subsequently, it is determined at step S108 whether or not the left/right turn determination flag is in the set state. If it is determined at step S108 that the left/right turn determination flag is in the reset state, the process goes to step S109 where the actuators adjust the directions of the light axes of the headlights 10L, 10R in accordance with the swiveling angles calculated at step S105 (during the period between the time t11 and the time t12 in FIG. 5) to complete the swivel control routine.

On the other hand, if it is determined at step S108 that the left/right turn determination flag is in the set state, then the process goes to step S110 to prohibit the actuators from adjusting the directions of the light axes of the headlights 10L, 10R (during the period between the time t05 and the time t10 in FIG. 5) to complete the swivel control routine.

As explained above, the apparatus according to the first embodiment of the invention includes the vehicle speed sensor (16L, 16R) for detecting the vehicle speed SPD, the steering angle sensor (18) for detecting the steering angle STA of the steering wheel (17) and a swivel control unit (20, 11L, 1R) for performing the swivel control by which the directions of the light axes of the vehicle headlights (10L, 10R) are swiveled horizontally by the swiveling angles depending on the vehicle speed SPD detected by the vehicle speed sensor (16L, 16R), the steering angle STA detected by the steering angle sensor (18), and the turn indication signal which the turn indicator (19) of the vehicle produces to indicate the status thereof. The swivel control unit determines that the vehicle is making a left or right turn and halts the swivel control, if the vehicle speed SPD is equal to or lower than the predetermined threshold speed SPDth and at least one of the conditions that the turn indication signal is in the on state, and that the steering angle STA is outside the predetermined angular range STAth is satisfied, the swivel control unit resuming the swivel control when the turn indication signal is changed into the off state.

To sum up, in the first embodiment, the swivel control for controlling the directions of the light axes of the headlights 10L, 10R on the basis of the vehicle speed SPD, the turn indication signal and the steering angle STA is disabled, if it is determined that the vehicle is making a left or right turn for the reason that the vehicle speed is equal to or lower than the predetermined threshold speed and at least one of the conditions that the turn indication signal is in the on state, and that the steering angle STA is outside the predetermined angular range around the neutral angular position of the steering wheel is satisfied. The condition for resuming the swivel control thereafter is only the change of the status of the turn indication signal into the off state.

Therefore, the swivel control restarts as soon as the status of the turn indication signal is changed into the off state irrespective of the vehicle speed at that moment in order to control the directions of the light axes of the headlights 10L, 10R responding to the steering angle. This quick resumption of the swivel control is of great help to the vehicle's driver when making a left or right turn after making a stop at an intersection, for example.

Next, a variant of the swivel control routine in the first embodiment which the CPU 21 of the ECU 20 performs is explained below with reference to the flowchart shown in FIG. 4 and the time chart shown in FIG. 5. The CPU 21 performs this swivel control routine at regular intervals.

Figure 4:
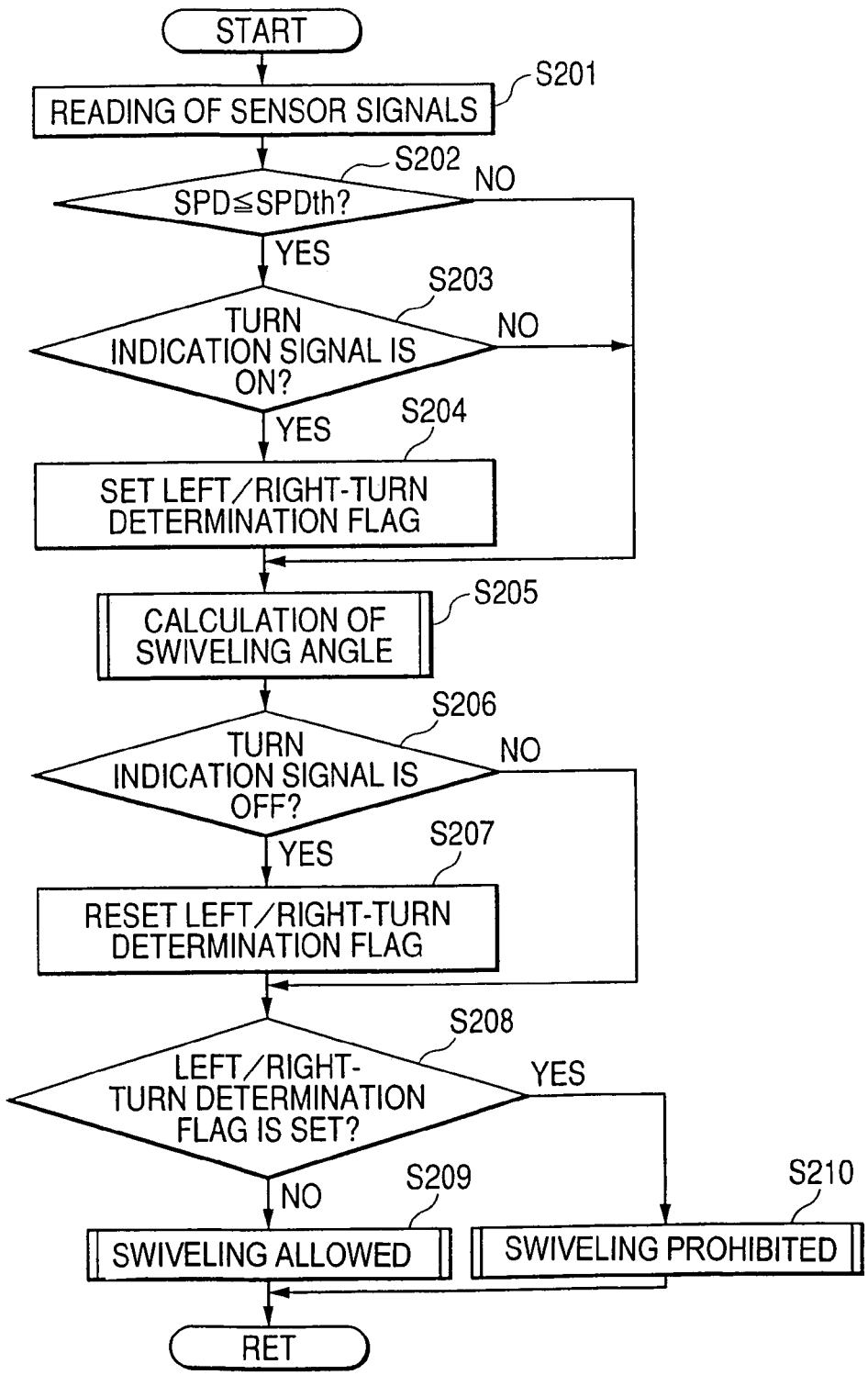
FIG. 4 is a flowchart for explaining a variant of the swivel control routine performed by the CPU within the ECU included in the apparatus according to the first embodiment.

As shown in FIG. 4, at step S201, various sensor signals are read. They include the vehicle speed SPD calculated from the left and right wheel speeds VL, VR outputted from the left and right wheel speed sensors 16L, 16R, the steering angle STA outputted from the steering angle sensor 18, and the turn indication signal (on or off) indicative of the status of the turn indicator 19. The steering angle STA is an angle by which the steering wheel 17 is turned from its neutral angular position, or straight-ahead position. When the steering angle STA is within the predetermined angular range STAth around the neutral angular position, it is determined that the vehicle is in a straight-running state. The predetermined angular range STAth is for determining whether or not the steering wheel 17 is turned to the left or right without influence of the play of the steering wheel 17.

Next, it is determined at step S202 whether or not the vehicle speed SPD is equal to or lower than the predetermined threshold speed SPDth. If it is determined at step S202 that the vehicle speed SPD is equal to or lower than the predetermined threshold speed SPDth (during the periods before the time t02, between the time 05 and the time t08, and after the time t13 in FIG. 5), then the process goes to step S203 where it is determined whether or not the turn indication signal is in the on state.

If it is determined at step S203 that the turn indication signal is in the on state, then the process goes to step S204 where the left/right turn determination flag is set (during the period between the time 05 and the time 09 in FIG. 5). The time t9 at which the turn indication signal changes from the on state to the off state tends to vary. However, since the time t09 roughly coincides with the time t10 at which the steering angle STA is reduced to within the angular range STAth and accordingly the steering angle flag is reset, the time at which the left/right turn determination flag is reset may be regarded as the time t10.

If it is determined at step S202 that the vehicle speed is higher than the predetermined threshold speed SPDth (during the periods between the time t02 and the time 05, and between the time 08 and the time t13 in FIG. 5), or it is determined at step S203 that the turn indication signal is in the off state (during the periods before the time t3, and after the time 09 in FIG. 5), then the step S204 is skipped to preserve the current status of the left/right turn determination flag.

Next, the process goes to step S205 where the swiveling angle calculation process is executed for calculating the swiveling angles of the headlights 10L, 10R. Subsequently, it is determined at step S206 whether or not the turn indication signal is in the off state. If it is determined at step S206 that the turn indication signal is in the off state, then the process goes to step S207 where the left/right turn determination flag is reset. Otherwise the step S207 is skipped to preserve the current status of the left/right turn determination flag.

Subsequently, it is determined at step S208 whether or not the left/right turn determination flag is in the reset state. If it is determined at step S208 that the left/right turn determination flag is in the reset state, the process goes to step S209 where the actuators adjust the directions of the light axes of the headlights 10L, 10R (during the period between the time t11 and the time t12 in FIG. 5) in accordance with the swiveling angles calculated at step S205 to complete the swivel control routine.

On the other hand, if it is determined at step S208 that the left/right turn determination flag is in the set state, then the process goes to step S210 to prohibit the actuators from adjusting the directions of the light axes of the headlights 10L, 10R (during the periods between the time t05 and the time t10 in FIG. 5) to complete the swivel control routine.

In this variant of the swivel control routine shown in FIG. 4, it is determined that the vehicle is making a left or right turn and the swivel control is halted upon the satisfaction of the conditions that the vehicle speed SPD is equal to or lower than the predetermined threshold speed SPDth, and that the turn indication signal is in the on state. The swivel control is resumed when the turn indication signal is changed to the off state. However, this variant may be configured to determined that the vehicle is making a left or right turn and halt the swivel control upon the satisfaction of the conditions that the vehicle speed SPD is equal to or lower than the predetermined threshold speed SPDth, that the turn indication signal is in the on state, and that the steering angle STA is outside the angular range STAth.

As explained above, the apparatus according to the variant of the first embodiment of the invention includes the vehicle speed sensor (16L, 16R) for detecting the vehicle speed SPD, the steering angle sensor (18) for detecting the steering angle STA of the steering wheel (17) of the vehicle, and the swivel control unit (20, 1L, 11R) for performing the swivel control by which the directions of the light axes of the vehicle headlights (10L, 10R) are swiveled horizontally by the swiveling angles depending on the vehicle speed SPD detected by the vehicle speed sensor (16L, 16R), the steering angle STA detected by the steering angle sensor (18), and the turn indication signal which the turn indicator (19) of the vehicle produces to indicate the status thereof. The swivel control unit determines that the vehicle is making a left or right turn and halts the swivel control, if the vehicle speed SPD detected by the vehicle speed sensor is equal to or lower than the predetermined threshold speed SPDth and the condition that the turn indication signal is in the on state is satisfied, the swivel control unit resuming the swivel control when the turn indication signal is changed into the off state.

To sum up, in this variant, the swivel control for controlling the directions of the light axes of the headlights 10L, 10R on the basis of the vehicle speed SPD, the turn indication signal and the steering angle STA is disabled, if it is determined that the vehicle is making a left or right turn for the reason that the conditions that the vehicle speed SPD is equal to or lower than the predetermined threshold speed, and that the turn indication signal is in the on state are both satisfied. The condition for resuming the swivel control thereafter is only the change of the status of the turn indication signal into the off state.

Therefore, the swivel control restarts as soon as the status of the turn indication signal is changed into the off state irrespective of the vehicle speed at that moment in order to control the directions of the light axes of the headlights 10L, 10R responding to the steering angle. This quick resumption of the swivel control is of great help to the vehicle's driver when making a left or right turn after making a stop at an intersection, for example.

In the first embodiment and its variant, the condition for resuming the swivel control after it is halted or disabled is only the status change of the turn indication signal into the off state.

Figure 6:
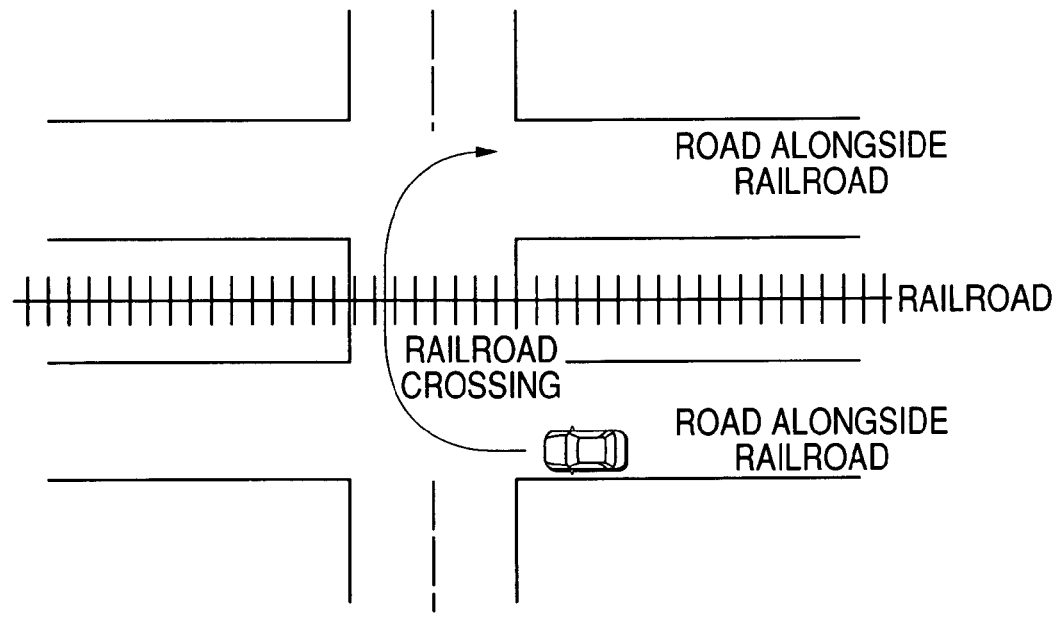
FIG. 6 is a diagram for explaining the advantageous effects of the first and the second embodiments in a case where a vehicle crosses a railroad crossing.

The advantageous effects of the first embodiment and its variant are explained below by way of an example. In FIG. 6, assume that a vehicle travels at a low speed along a road running alongside a railroad, makes a first right turn to cross the railroad crossing, and makes a second right turn to go into another road running alongside the same railroad.

The vehicle driver starts to make the first right turn by setting the turn indicator 19. The turn indication signal is set at the on state at this time. The vehicle makes a stop short of the railroad crossing, and accordingly the condition for disabling the swivel control is satisfied even if the steering angle STA is beyond the predetermined angular range STAth at that moment. After that, the vehicle starts moving. The steering wheel is moved back to the neutral angular position, and accordingly the steering angle STA approaches zero. Therefore, the turn indication signal returns to the off state while the vehicle is crossing the railroad crossing. Thus, the swivel control is resumed as soon as the vehicle finishes crossing the railroad crossing irrespective of the vehicle speed, and so the driver can receive the full benefit of the swivel control when making the second right turn to go into the road alongside the railroad.

Figure 7:
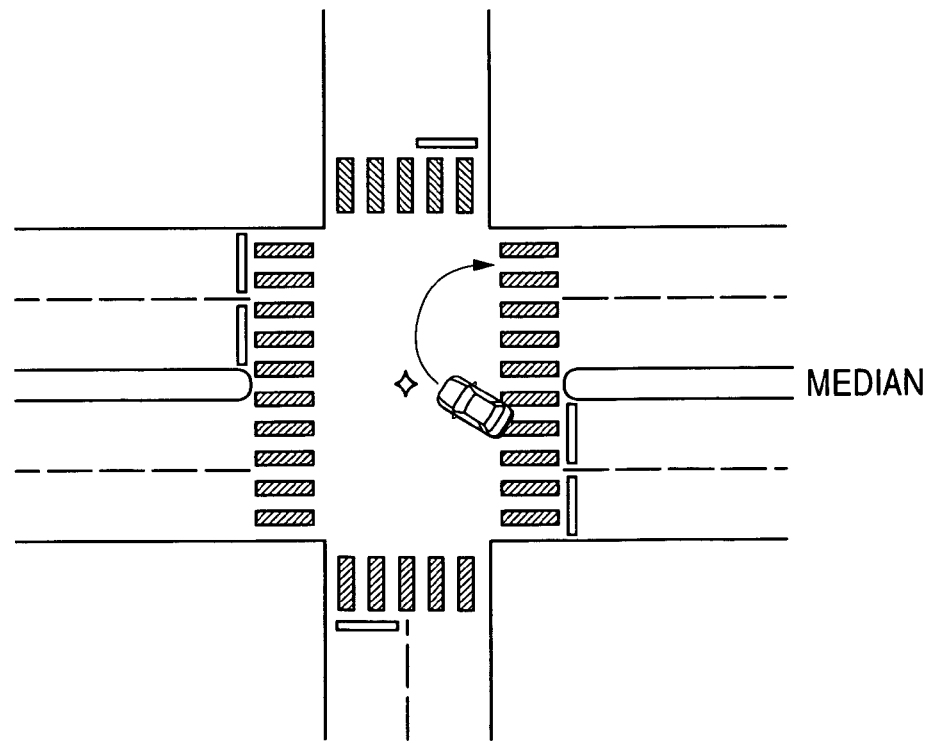
FIG. 7 is a diagram for explaining the advantageous effects of the first embodiment in a case where a vehicle makes a U-turn at an intersection.

The swivel control is further explained below by way of another example with reference to FIG. 5 and FIG. 7. FIG. 7 shows a vehicle making a U-turn at an intersection. If the vehicle makes a stop at the intersection, the condition for halting the swivel control is satisfied. In this case, if the driver restarts the vehicle without moving back the steering wheel, the swivel control is not resumed until the vehicle finishes the U-turn.

However, if the driver intentionally resets the turn indicator just before or after restarting the vehicle, the turn indication signal returns to the off state at the time t07 shown in FIG. 5. As a result, the swivel control is resumed, because the left/right turn determination flag is reset and accordingly the swivel control flag is set at the time t07. To sum up, it becomes possible to perform the swivel control during the period between the time t07 and the time t10 (the shaded portion in FIG. 5) included in the period between the time t05 and the time t10 over which the swivel control is disabled if the driver does not intentionally reset the turn indicator. As explained above, the driver can use the turn indicator 19 as a switch for resuming the swivel control. In other words, the driver can have the swivel control reflecting the driver's intention.

Second Embodiment

Figure 8:
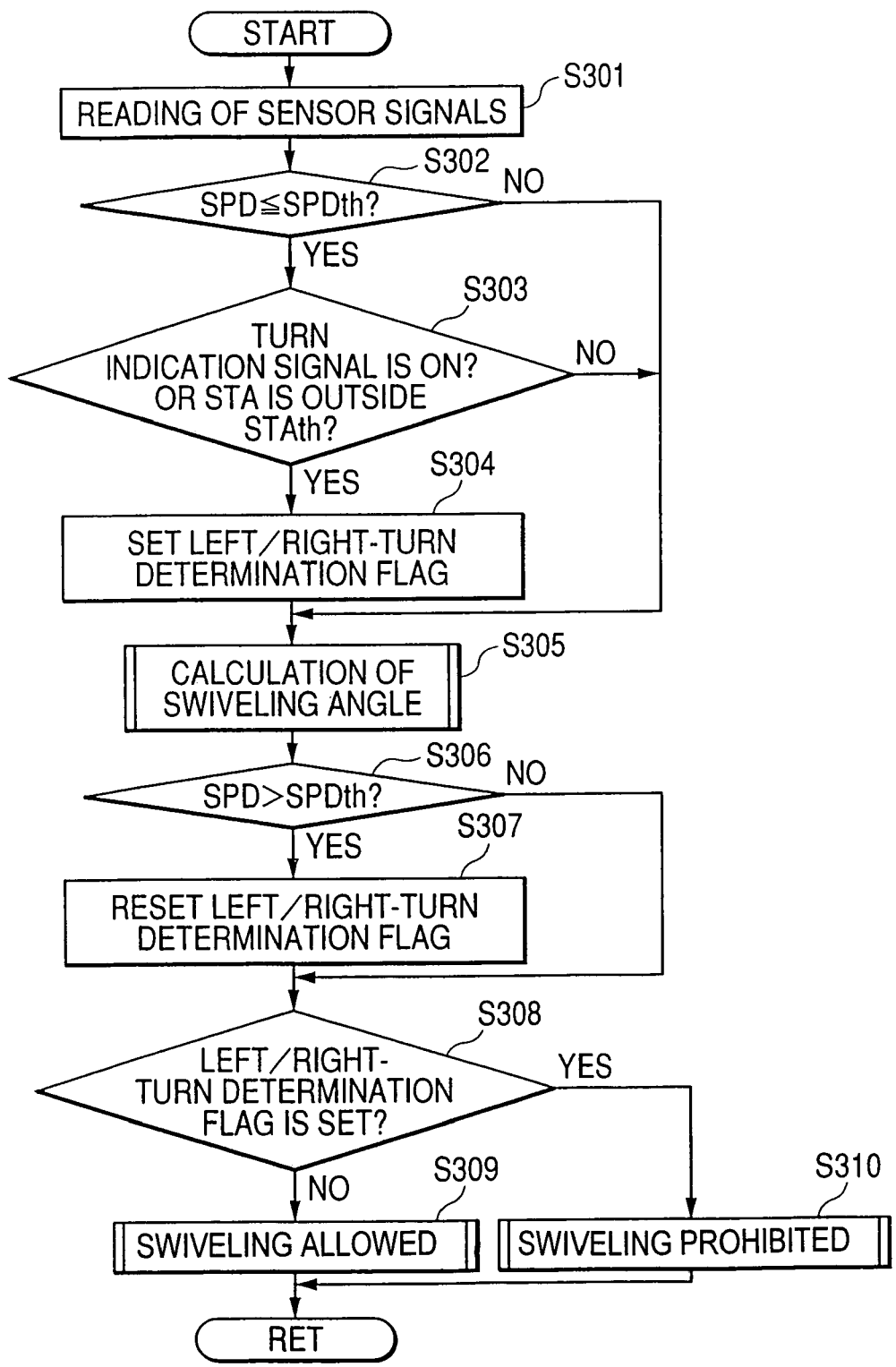
FIG. 8 is a flowchart for explaining the swivel control routine performed by a CPU within an ECU included in the apparatus according to the second embodiment.

FIG. 8 is a flowchart for explaining the swivel control routine performed by the CPU 21 within the ECU 20 included in an apparatus for automatically adjusting a direction of a light axis of a vehicle headlight according to a second embodiment of the invention. The CPU 21 performs this swivel control routine at regular intervals. The structure of the second embodiment is the same as that of the first embodiment shown in FIG. 1, and accordingly explanation thereof is omitted.

The steps S301 to S305 in FIG. 8 correspond to the steps S101 to S105 in FIG. 3, and accordingly explanations thereof are omitted. At step S306, it is determined whether or not the vehicle speed SPD is higher than the predetermined threshold speed SPDth. If it is determined at step S306 that the vehicle speed SPD is higher than the predetermined threshold speed SPDth, then the process goes to step S307 where the left/right turn determination flag is reset. Otherwise the step S307 is skipped to preserve the current status of the left/right turn determination flag.

Subsequently, it is determined at step S308 whether or not the left/right turn determination flag is in the set state. If it is determined at step S308 that the left/right turn determination flag is in the reset state, then the process goes to step S309 to adjust the directions of the light axes of the headlights 10L, 10R to complete the swivel control routine.

In this step S309, the swiveling angles calculated at step S305 are put through a filter. The actuators 1L, 11R act to swivel the directions of the light axes of the headlight 10L, 10R by the filtered swiveling angles. The swiveling angle outputted from the filter is given by the following equation (1).

$$\theta new = a \times f(SPD, STA) + (1-a) \times \theta old \quad (1)$$

where θnew is the filtered swiveling angle outputted from the filter, a is a constant, f(SPD, STA) is a swiveling angle calculated at step S305, and θold is the filtered swiveling angle which was outputted from the same filter in the last swivel control routine.

At step S309, the constant a is set at 0.30 during a predetermined period just after the swivel control is resumed in order to subject the swiveling angle to a strong filtering, and then set at 0.2 in order to subject the swiveling angle to a weak filtering.

On the other hand, if it is determined at step S308 that the left/right turn determination flag is in the set state, then the process goes to step S310 to prohibit the actuators from adjusting the directions of the light axes of the headlights 10L, 10R to complete the swivel control routine.

As explained above, the apparatus according to the second embodiment of the invention includes the vehicle speed sensor (16L, 16R) for detecting the vehicle speed SPD of the vehicle, the steering angle sensor (18) for detecting the steering angle STA of the steering wheel (17) of the vehicle; and the swivel control unit (20, 11L, 11R) for performing the swivel control by which the directions of the light axes of the vehicle headlights (10L, 10R) are swiveled horizontally by swiveling angles depending on the vehicle speed SPD detected by the vehicle speed sensor (16L, 16R), the steering angle STA detected by the steering angle sensor (18), and the turn indication signal which the turn indicator (19) of the vehicle produces to indicate a status thereof. The swivel control unit determines that the vehicle is making a left or right turn and halts the swivel control, if the vehicle speed SPD detected by the vehicle speed sensor is equal to or lower than the predetermined threshold speed SPDth and at least one of the conditions that the turn indication signal is in the on state, and that the steering angle STA is outside the predetermined angular range is satisfied, the swivel control unit resuming the swivel control when the vehicle speed SPD exceeds the predetermined threshold speed SPDth, the swivel control unit subjecting the swiveling angles to the strong filtering for a predetermined time period when the swivel control is resumed, and subsequently to the weak filtering in order to avoid abrupt changes in the directions of the light axes of the vehicle headlights during the predetermined time period.

In this embodiment, the swivel control for controlling the directions of the light axes of the headlights 10L, 10R on the basis of the vehicle speed SPD, the turn indication signal and the steering angle STA is disabled, if the vehicle speed is equal to or lower than the predetermined threshold speed and at least one of the conditions that turn indication signal is in the on state, and that the steering angle STA is outside the predetermined angular range is satisfied. The condition for resuming the swivel control thereafter is only the increase of the vehicle speed SPD up to the predetermined threshold speed.

Therefore, as soon as the vehicle speed exceeds the predetermined threshold speed after the swivel control is disabled, the swivel control is resumed in order to adjust the directions of the light axes of the headlights 10L, 10R responding to the steering angle. Furthermore, since the calculated swiveling angle is subjected to the strong filtering for a predetermined time period when resuming the swiveling control, the directions of the light axes of the headlights 10L, 10R swivel only gradually during this time period. Accordingly, even when the condition for resuming the swivel control after it is disabled is only the vehicle speed SPD, the movements of the headlights 10L, 10R when the swivel control is resumed can be made gentle, and so the driver can receive the full benefit of the swivel control without feeling awkwardness in the control of the beam patterns.

Next, a variant of the swivel control routine which the CPU 21 of the ECU 20 included in the apparatus according to the second embodiment performs is explained below with reference to the flowchart shown in FIG. 9. The CPU 21 performs this swivel control routine at regular intervals.

Figure 9:
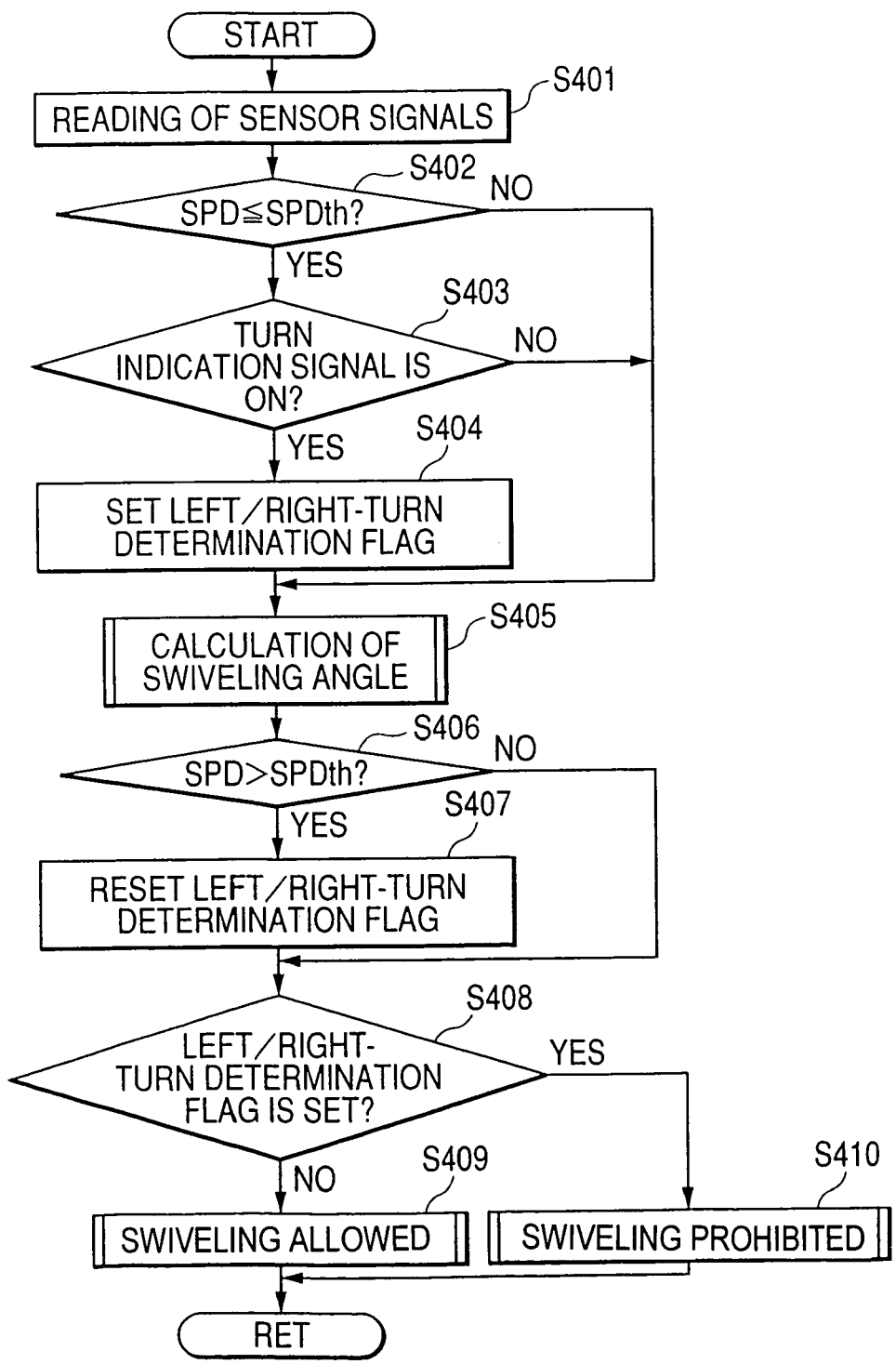
FIG. 9 is a flowchart for explaining a variant of the swivel control routine performed by the CPU within the ECU included in the apparatus according to the second embodiment.

The steps S401 to S405 in FIG. 9 correspond to the steps S201 to S205 in FIG. 4, and accordingly explanations thereof are omitted.

At step S406, it is determined whether or not the vehicle speed SPD is higher than the predetermined threshold speed SPDth. If it is determined at step S406 that the vehicle speed SPD is higher than the predetermined threshold speed SPDth, then the process goes to step S407 where the left/right turn determination flag is reset. Otherwise the step S407 is skipped to preserve the current status of the left/right turn determination flag.

Subsequently, it is determined at step 408 whether or not the left/right turn determination flag is in the set state. If it is determined at step S408 that the left/right turn determination flag is in the reset state, then the process goes to step S409 to adjust the directions of the light axes of the headlights 10L, 10R to complete the swivel control routine.

At step S409, the filtering process as represented by the equation (1) is performed at the time of resuming the swivel control.

On the other hand, if it is determined at step S408 that the left/right turn determination flag is in the set state, then the process goes to step S410 to prohibit the actuators from adjusting the light axes of the headlights 10L, 10R to complete the swivel control routine.

As explained above, the apparatus according to the variant of the second embodiment of the invention includes: the vehicle speed sensor (16L, 16R) for detecting the vehicle speed SPD of the vehicle; the steering angle sensor (18) for detecting the steering angle STA of the steering wheel 17 of the vehicle; and the swivel control unit (ECU 20, 11L, 11R) for performing the swivel control by which the directions of the light axes of the vehicle headlights (10L, 10R) are swiveled horizontally by swiveling angles depending on the vehicle speed detected SPD by the vehicle speed sensor, the steering angle STA detected by the steering angle sensor (18), and the turn indication signal which the turn indicator (19) of the vehicle produces to indicate a status thereof, wherein the swivel control unit determines that the vehicle is making a left or right turn and halts the swivel control, if the vehicle speed SPD detected by the vehicle speed sensor is equal to or lower than the predetermined threshold speed SPDth, and the turn indication signal is in the on state, the swivel control unit resuming the swivel control when the vehicle speed SPD exceeds the predetermined threshold speed SPDth, and wherein the swivel control unit subjects the swiveling angles to a filtering for a predetermined time period when the swivel control is resumed in order to avoid abrupt change in the directions of the light axes during the predetermined time period.

In this variant, it is determined that the vehicle is making a left or right turn, and the swivel control is halted, if the vehicle speed PSD is equal to or lower than the predetermined threshold speed and the condition that the turn indication signal is in the on state is satisfied. The condition for resuming the swivel control thereafter is only the increase of the vehicle speed SPD up to the predetermined threshold speed SPDth.

Therefore, as soon as the vehicle speed SPD exceeds the predetermined threshold speed after the swivel control is halted, the swivel control is resumed in order to adjust the directions of the headlights 10L, 10R responding to the steering angle STA. Furthermore, since the calculated swiveling angle is subjected to the strong filtering for a predetermined time period when resuming the swiveling control, the directions of the light axes of the headlights 10L, 10R swivel gradually during this time period. Accordingly, even when the condition for resuming the swivel control after it is disabled is only the vehicle speed SPD, the movements of the headlights when the swivel control is resumed can be made gentle, and so the driver can receive the full benefit of the swivel control early on without feeling awkwardness in the control of the beam patterns.

In the second embodiment and its variant, the condition for resuming the swivel control after it is disabled, is only the increase of the vehicle speed SPD up to the predetermined threshold speed SPDth. The advantageous effects of the second embodiment ad its variant is explained below by way of an example with reference to FIG. 6. Assume that a vehicle travels at a low speed along a road running alongside a railroad, makes a first right turn to cross the railroad crossing, and makes a second right turn to go into another road running alongside the same railroad. The vehicle makes a stop short of the railroad crossing, and the condition for disabling the swivel control is therefore satisfied even when the steering angle STA is beyond the predetermined angular range STAth at that time. After that the vehicle starts moving. When the vehicle speed SPD exceeds the predetermined threshold speed SPDth, the swivel control is resumed even while the vehicle is crossing the railroad crossing. As explained above, the calculated swiveling angle is subjected to the strong filtering for a certain period time, and accordingly it becomes possible to prevent abrupt movements of the headlights 10L, 10R even when the steering angle is relatively large.

Third Embodiment

Figure 10:
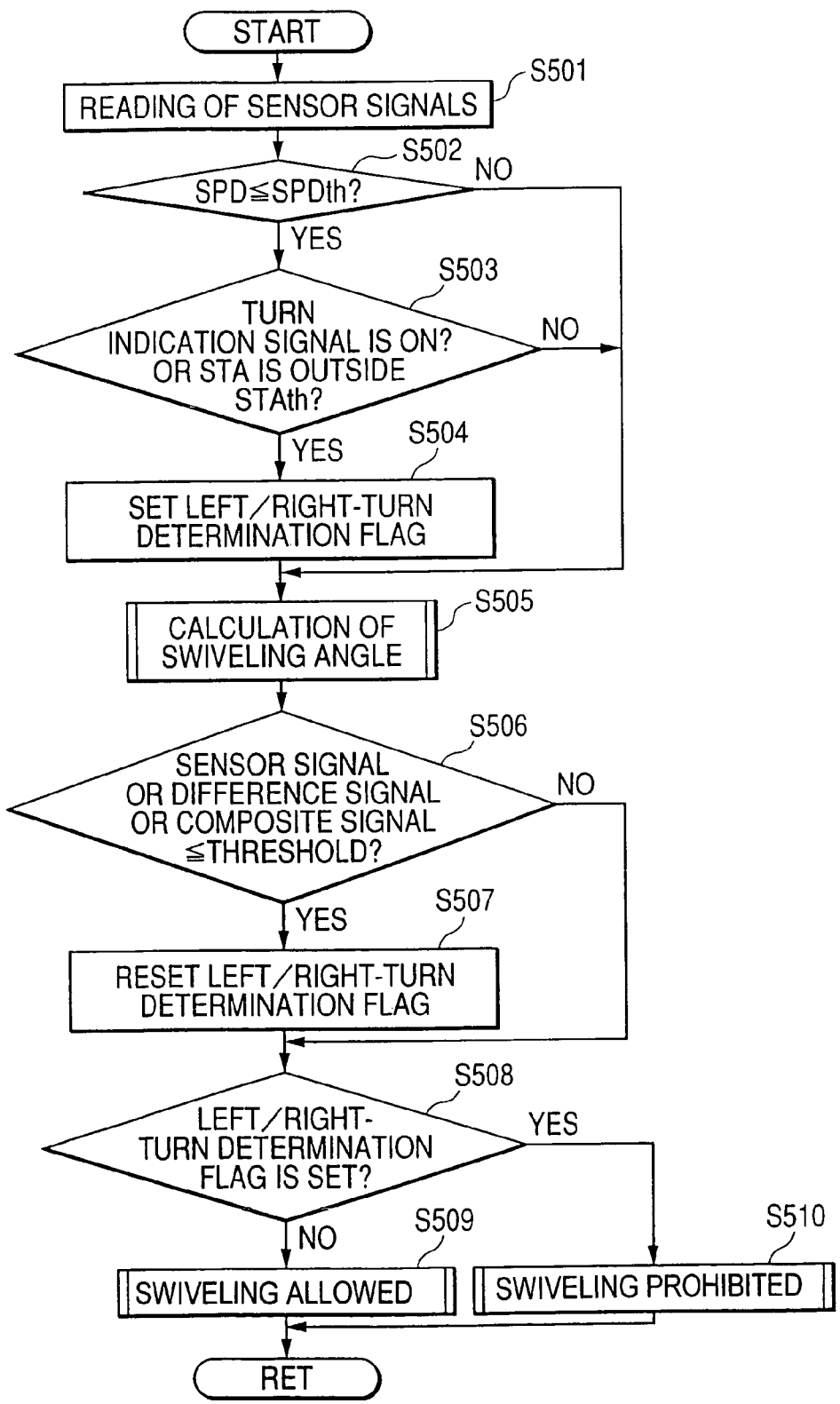
FIG. 10 is a flowchart for explaining the swivel control routine performed by a CPU within an ECU included in the apparatus according to the third embodiment.

FIG. 10 is a flowchart for explaining the swivel control routine performed by the CPU 21 within an ECU 20 included in an apparatus for automatically adjusting a direction of a light axis of a vehicle headlight according to a third embodiment of the invention. The CPU 21 performs this swivel control routine at regular intervals. The structure of the third embodiment is the same as that of the first embodiment shown in FIG. 1, and accordingly explanation thereof is omitted.

The steps 501 to S505 in FIG. 10 correspond to the steps S101 to S105 in FIG. 3, and accordingly explanations thereof are omitted. At step S506, it is checked whether or not any change larger than a predetermined value occurs in at least one of sensor signals outputted from sensors mounted on the vehicle to detect the attitude of the vehicle. More specifically, it is checked whether or not there occurs a lowering to within a predetermined threshold in at least one of a yaw rate signal outputted from a yaw rate sensor, a lateral acceleration signal outputted from a lateral acceleration sensor, a pitch angle signal outputted from a pitch angle sensor, a rolling angle signal outputted from a rolling angle sensor, and a vehicle swivel speed signal outputted from an vehicle swivel speed sensor which may be a laser sensor, a radar sensor or an ultrasonic sensor, or a lowering to within a predetermined threshold in at least one of a difference between air pressure signals indicative of air pressures of the left and right tires outputted from left and right air pressure sensors, a difference signal between left and right wheel speed signals outputted from left and right wheel speed sensors, a difference between left and right vehicle height signals outputted from left and right vehicle height sensors, and a difference between front and rear vehicle height signals outputted from front and rear vehicle height sensors.

Alternatively, it is possible to check whether or not any change larger than a predetermined value occurs in at least one of composite signals produced by combining two or more of the sensor signals at step 506.

If it is determined at step S506 that there occurs a change larger than a predetermined value in at least one of the sensor signals, difference signals or composite signals, then the left/right turn determination flag is reset. Otherwise the step S507 is skipped to preserve the current status of the left/right turn determination flag.

Subsequently, it is determined at step 508 whether or not the left/right turn determination flag is in the set state. If it is determined at step S508 that the left/right turn determination flag is in the reset state, then the process goes to step S509 to adjust the directions of the light axes of the headlights 10L, 10R to complete the swivel control routine.

On the other hand, if it is determined at step S508 that the left/right turn determination flag is in the set state, then the process goes to step S510 to prohibit the actuators from adjusting the directions of the light axes of the headlights 10L, 10R to complete the swivel control routine.

As explained above, the apparatus according to the third embodiment of the invention includes the vehicle speed sensor (16L, 16R) for detecting the vehicle speed SPD of the vehicle, the steering angle sensor (18) for detecting the steering angle STA of the steering wheel (17) of the vehicle, and the swivel control unit (20, 11L, 11R) for performing the swivel control by which the directions of the light axes of the vehicle headlights (10L, 10R) are swiveled horizontally by the swiveling angles depending on the vehicle speed SPD detected by the vehicle speed sensor (16L, 16R), the steering angle STA detected by the steering angle sensor (18), and the turn indication signal which the turn indicator (19) of the vehicle produces to indicate a status thereof. The swivel control unit determines that the vehicle is making a left or right turn and halts the swivel control, if the vehicle speed SPD detected by the vehicle speed sensor is equal to or lower than the predetermined threshold speed SPDth and at least one of the conditions that the turn indication signal is in the on state, and that the steering angle is outside the predetermined angular range is satisfied, the swivel control unit resuming the swivel control upon detecting a change larger than a predetermined value in at least one of the signals outputted from the sensors mounted on the vehicle to detect the attitude of the vehicle.

In the third embodiment, the swivel control is disabled, if it is determined that the vehicle is making a left or right turn for the reason that the vehicle speed SPD is equal to or lower than the predetermined threshold speed SPDth and at least one of the conditions that turn indication signal is in the on state, and that the steering angle STA is outside the predetermined angular range STAth is satisfied.

The swivel control is resumed when any change larger than a predetermined value is detected in at least one of the sensor signals, difference signals or composite signals in order to adjust the directions of the headlights 10L, 10R responding to the steering angle STA. Generally, the sensor signals supplied from these sensors are more reliable in accuracy than the vehicle speed PSD calculated based on the left and right wheel speeds outputted from the left and right wheel speed sensors 16L, 16R, the turn indication signal indicative of the status of the turn indicator 19, and the steering angle STA outputted from the steering angle sensor 18. Accordingly, by detecting a minute change in at least one of the sensor signals from these sensors and using it as a signal for resuming the swivel control, it becomes possible for the driver to receive the benefit of the swivel control in more exact timing.

Next, a variant of the swivel control routine which the CPU 21 of the ECU 20 included in the apparatus according to the third embodiment performs is explained below with reference to the flowchart shown in FIG. 11. The CPU 21 performs this swivel control routine at regular intervals.

Figure 11:
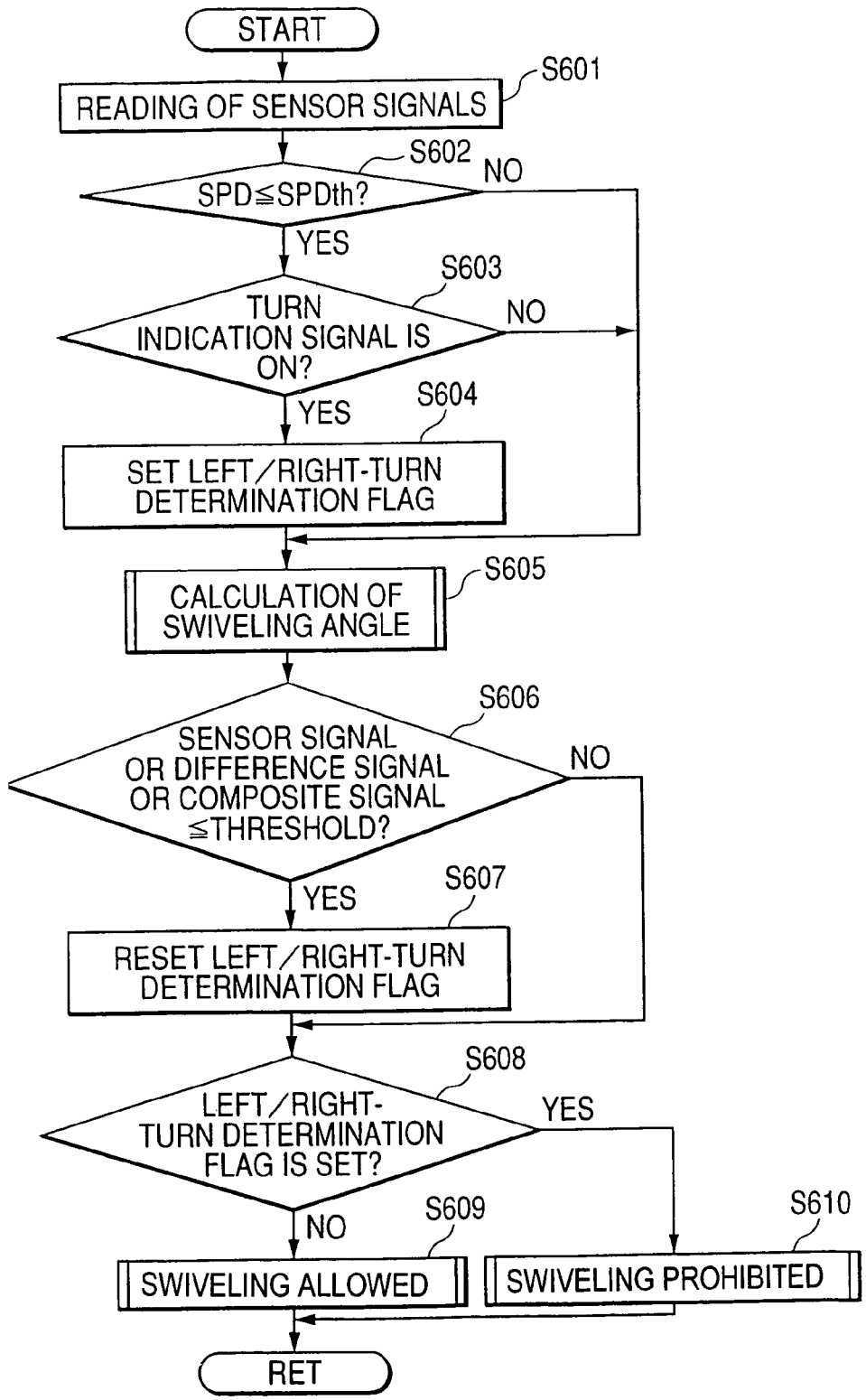
FIG. 11 is a flowchart for explaining a variant of the swivel control routine performed by the CPU within the ECU included in the apparatus according to the third embodiment.

The steps S601 to S605 in FIG. 11 correspond to the steps S201 to S205 in FIG. 4, and accordingly explanations thereof are omitted. At step S606, it is checked whether or not any change larger than a predetermined value occurs in at least one of sensor signals outputted from sensors mounted on the vehicle to detect the attitude of the vehicle. More specifically, it is checked whether or not there occurs a lowering to within a predetermined threshold in at least one of a yaw rate signal outputted from a yaw rate sensor, a lateral acceleration signal outputted from a lateral acceleration sensor, a pitch angle signal outputted from a pitch angle sensor, a rolling angle signal outputted from a rolling angle sensor, and a vehicle swivel speed signal outputted from an vehicle swivel speed sensor which may be a laser sensor, a radar sensor or an ultrasonic sensor, or a lowering to within a predetermined threshold in at least one of a difference between air pressure signals indicative of air pressures of the left and right tires outputted from left and right air pressure sensors, a difference signal between left and right wheel speed signals outputted from left and right wheel speed sensors, a difference between left and right vehicle height signals outputted from left and right vehicle height sensors, and a difference between front and rear vehicle height signals outputted from front and rear vehicle height sensors.

Alternatively, it is possible to check whether or not any change larger than a predetermined value occurs in at least one of composite signals produced by combining two or more of the sensor signals at step 506.

If it is determined at step S606 that there occurs a change larger than a predetermined value in at least one of the sensor signals, difference signals or composite signals, then the left/right turn determination flag is reset at step S607. Otherwise the step S607 is skipped to preserve the current status of the left/right turn determination flag.

Subsequently, it is determined at step 608 whether or not the left/right turn determination flag is in the set state. If it is determined at step S608 that the left/right turn determination flag is in the reset state, then the process goes to step S609 to adjust the directions of the light axes of the headlights 10L, 10R to complete the swivel control routine.

On the other hand, if it is determined at step S608 that the left/right turn determination flag is in the set state, then the process goes to step S610 to prohibit the actuators from adjusting the directions of the light axes of the headlights 10L, 10R to complete the swivel control routine.

As explained above, the apparatus according to the variant of the third embodiment of the invention includes the vehicle speed sensor (16L, 16R) for detecting the vehicle speed SPD of the vehicle, the steering angle sensor (18) for detecting the steering angle STA of the steering wheel (17) of the vehicle, and the swivel control unit (20, 11L, 11R) for performing the swivel control by which the directions of the light axes of the vehicle headlights (10L, 10R) are swiveled horizontally by the swiveling angles depending on the vehicle speed SPD detected by the vehicle speed sensor (16L, 16R), the steering angle STA detected by the steering angle sensor (18), and the turn indication signal which the turn indicator (19) of the vehicle produces to indicate a status thereof. The swivel control unit determines that the vehicle is making a left or right turn and halts the swivel control, if the vehicle speed detected by the vehicle speed sensor is equal to or lower than a predetermined threshold speed and the condition that the turn indication signal is in the on state is satisfied, the swivel control unit resuming the swivel control upon detecting a change larger than a predetermined value in at least one of the signals outputted from the sensors mounted on the vehicle to detect the attitude of the vehicle.

In this variant, the swivel control is disabled, if it is determined that the vehicle is making a left or right turn for the reason that the vehicle speed SPD is equal to or lower than the predetermined threshold speed SPDth and the condition that the turn indication signal is in the on state is satisfied.

The swivel control is resumed when any change larger than a predetermined value is detected in at least one of the sensor signals, difference signals or composite signals in order to adjust the directions of the headlights 10L, 10R responding to the steering angle STA.

Generally, the sensor signals supplied from these sensors are more reliable in accuracy and more sensitive to the changes in the vehicle attitude than the vehicle speed PSD calculated based on the left and right wheel speeds outputted from the left and right wheel speed sensors 16L, 16R, the turn indication signal indicative of the status of the turn indicator 19, and the steering angle STA outputted from the steering angle sensor 18. Accordingly, by detecting a minute change in at least one of the sensor signals, difference signals or composite signals, and using it as a signal for resuming the swivel control, it becomes possible for the driver to receive the benefit of the swivel control in more exact timing.

The above explained preferred embodiments are exemplary of the invention of the present application which is described solely by the claims appended below. It should be understood that modifications of the preferred embodiments may be made as would occur to one of skill in the art.

What is claimed is:

1. An apparatus for automatically adjusting a direction of a light axis of a vehicle headlight comprising:
   a vehicle speed sensor for detecting a vehicle speed of said vehicle;
   a steering angle sensor for detecting a steering angle of a steering wheel of said vehicle; and
   a swivel control unit for performing a swivel control by which said direction of said light axis of said vehicle headlight is swiveled horizontally by a swiveling angle depending on said vehicle speed detected by said vehicle speed sensor, said steering angle detected by said steering angle sensor, and a turn indication signal produced by a turn indicator of said vehicle, wherein said swivel control unit determines that said vehicle is making a left or right turn and halts said swivel control, if said vehicle speed detected by said vehicle speed sensor is equal to or lower than a predetermined threshold speed and at least one of conditions that said turn indication signal is in an on state, and that said steering angle is outside a predetermined angular range is satisfied, said swivel control unit resuming said swivel control when said turn-indication signal is changed into an off state.

2. An apparatus for automatically adjusting a direction of a light axis of a vehicle headlight comprising:

a vehicle speed sensor for detecting a vehicle speed of said vehicle;

a steering angle sensor for detecting a steering angle of a steering wheel of said vehicle; and a swivel control unit for performing a swivel control by which said direction of said light axis of said vehicle headlight is swiveled horizontally by a swiveling angle depending on said vehicle speed detected by said vehicle speed sensor, said steering angle detected by said steering angle sensor, and a turn indication signal produced by a turn indicator of said vehicle, wherein said swivel control unit determines that said vehicle is making a left or right turn and halts said swivel control, if said vehicle speed detected by said vehicle speed sensor is equal to or lower than a predetermined threshold speed, and a condition that said turn indication signal is in an on state is satisfied, said swivel control unit resuming said swivel control when said turn indication signal is changed into an off state.

3. An apparatus for automatically adjusting a direction of a light axis of a vehicle headlight comprising:

a vehicle speed sensor for detecting a vehicle speed of said vehicle;

a steering angle sensor for detecting a steering angle of a steering wheel of said vehicle; and a swivel control unit for performing a swivel control by which said direction of said light axis of said vehicle headlight is swiveled horizontally by a swiveling angle depending on said vehicle speed detected by said vehicle speed sensor, said steering angle detected by said steering angle sensor, and a turn indication signal produced by a turn indicator of said vehicle, wherein said swivel control unit determines that said vehicle is making a left or right turn and halts said swivel control, if said vehicle speed detected by said vehicle speed sensor is equal to or lower than a predetermined threshold speed and at least one of conditions that said turn indication signal is in an on state, and that said steering angle is outside a predetermined angular range, said swivel control unit resuming said swivel control when said vehicle speed detected by said vehicle speed sensor exceeds said predetermined threshold speed, and wherein said swivel control unit subjects said swiveling angle to a strong filtering for a predetermined time period when said swivel control is resumed, and subsequently to a weak filtering in order to avoid abrupt change in said direction of said light axis during said predetermined time period.

4. An apparatus for automatically adjusting a direction of a light axis of a vehicle headlight comprising:

a vehicle speed sensor for detecting a vehicle speed of said vehicle;

a steering angle sensor for detecting a steering angle of a steering wheel of said vehicle; and a swivel control unit for performing a swivel control by which said direction of said light axis of said vehicle headlight is swiveled horizontally by a swiveling angle depending on said vehicle speed detected by said vehicle speed sensor, said steering angle detected by said steering angle sensor, and a turn indication signal produced by a turn indicator of said vehicle, wherein said swivel control unit determines that said vehicle is making a left or right turn and halts said swivel control, if said vehicle speed detected by said vehicle speed sensor is equal to or lower than a predetermined threshold speed, and a condition that said turn indication signal is in an on state is satisfied, said swivel control unit resuming said swivel control when said vehicle speed exceeds said predetermined threshold speed, and wherein said swivel control unit subjects said swiveling angle to a filtering for a predetermined time period when said swivel control is resumed in order to avoid abrupt change in said direction of said light axis during said predetermined time period.

5. An apparatus for automatically adjusting a direction of a light axis of a vehicle headlight comprising:

a vehicle speed sensor for detecting a vehicle speed of said vehicle;

a steering angle sensor for detecting a steering angle of a steering wheel of said vehicle; and a swivel control unit for performing a swivel control by which said direction of said light axis of said vehicle headlight is swiveled horizontally by a swiveling angle depending on said vehicle speed detected by said vehicle speed sensor, said steering angle detected by said steering angle sensor, and a turn indication signal produced by a turn indicator of said vehicle, wherein said swivel control unit determines that said vehicle is making a left or right turn and halts said swivel control, if said vehicle speed detected by said vehicle speed sensor is equal to or lower than a predetermined threshold speed and at least one of conditions that said turn indication signal is in an on state, and that said steering angle is outside a predetermined angular range is satisfied, said swivel control unit resuming said swivel control upon detecting a change larger than a predetermined value in at least one of signals outputted from sensors mounted on said vehicle to detect an attitude of said vehicle.

6. An apparatus for automatically adjusting a direction of a light axis of a vehicle headlight according to claim 5, wherein said swivel control unit resumes said swivel control upon detecting a lowering to within a predetermined threshold in at least one of a yaw rate signal outputted from a yaw rate sensor, a lateral acceleration signal outputted from a lateral acceleration sensor, a pitch angle signal outputted from a pitch angle sensor, a rolling angle signal outputted from a rolling angle sensor, and a vehicle swivel speed signal outputted from an vehicle swivel speed sensor, or upon detecting a lowering to within a threshold in at least one of a difference between air pressure signals indicative of air pressures of left and right tires outputted from left and right air pressure sensors, a difference between left and right wheel speed signals outputted from left and right wheel speed sensors, a difference between left and right vehicle height signals outputted from left and right vehicle height sensors, and a difference between front and rear vehicle height signals outputted from front and rear vehicle height sensors.

7. An apparatus for automatically adjusting a direction of a light axis of a vehicle headlight comprising:
- a vehicle speed sensor for detecting a vehicle speed of said vehicle;
- a steering angle sensor for detecting a steering angle of a steering wheel of said vehicle; and
- a swivel control unit for performing a swivel control by which said direction of said light axis of said vehicle headlight is swiveled horizontally by a swiveling angle depending on said vehicle speed detected by said vehicle speed sensor, said steering angle detected by said steering angle sensor, and a turn indication signal produced by a turn indicator of said vehicle, wherein said swivel control unit determines that said vehicle is making a left or right turn and halts said swivel control, if said vehicle speed detected by said vehicle speed sensor is equal to or lower than a predetermined threshold speed and a condition that said turn indication signal is in an on state is satisfied, said swivel control unit resuming said swivel control upon detecting a change larger than a predetermined value in at least one of signals outputted from sensors mounted on said vehicle to detect an attitude of said vehicle.

8. An apparatus for automatically adjusting a direction of a light axis of a vehicle headlight according to claim 7, wherein said swivel control unit resumes said swivel control upon detecting
- a lowering to within a predetermined threshold in at least one of a yaw rate signal outputted from a yaw rate sensor, a lateral acceleration signal outputted from a lateral acceleration sensor, a pitch angle signal outputted from a pitch angle sensor, a rolling angle signal outputted from a rolling angle sensor, and a vehicle swivel speed signal outputted from an vehicle swivel speed sensor, or upon detecting
- a lowering to within a threshold in at least one of a difference between air pressure signals indicative of air pressures of left and right tires outputted from left and right air pressure sensors, a difference between left and right wheel speed signals outputted from left and right wheel speed sensors, a difference between left and right vehicle height signals outputted from left and right vehicle height sensors, and a difference between front and rear vehicle height signals outputted from front and rear vehicle height sensors.

* * * * *